United States Patent [19]
Seibert et al.

[11] Patent Number: 4,775,920
[45] Date of Patent: Oct. 4, 1988

[54] ILLUMINATED FISHING POLE

[76] Inventors: Charles Seibert, P.O. Box 78; Mickey L. Zindars, P.O. Box 72, both of, Armstrong, Ill. 61812

[21] Appl. No.: 871,812
[22] Filed: Jun. 6, 1986
[51] Int. Cl.4 .................... F21V 33/00; A01K 75/02
[52] U.S. Cl. .................................... 362/109; 362/32; 43/17.5
[58] Field of Search ............... 362/109, 187, 119, 253, 362/102, 32; 43/17.5, 18.1

[56] References Cited

U.S. PATENT DOCUMENTS

| | | | |
|---|---|---|---|
| 1,814,506 | 7/1931 | Nuckolls | 362/187 |
| 2,012,894 | 8/1935 | Shoemaker | 43/18.1 |
| 2,611,019 | 9/1952 | Warner | 362/102 |
| 3,074,196 | 1/1963 | Bronson | 362/102 |
| 3,862,509 | 1/1975 | Peterson, Jr. | 43/17.5 |
| 4,026,059 | 5/1977 | Ochs | 43/17.5 |
| 4,085,437 | 4/1978 | Hrdlicka et al. | 362/109 |
| 4,117,618 | 10/1978 | Utsler | 43/17.5 |

FOREIGN PATENT DOCUMENTS 2170081 7/1986 United Kingdom ................ 43/17.5

Primary Examiner—Ira S. Lazarus
Assistant Examiner—D. M. Cox
Attorney, Agent, or Firm—Rogers & Killeen

[57] ABSTRACT

A fishing pole for twilight, night, and early morning use. The pole has a light source for providing rod glow to assist in monitoring rod movement, and a glow controller for selectively varying the intensity of rod glow to assist in baiting and other tasks. Alternative embodiments are also disclosed in which light is selectively emitted from the pole handle to provide visibility for baiting and other tasks.

2 Claims, 1 Drawing Sheet

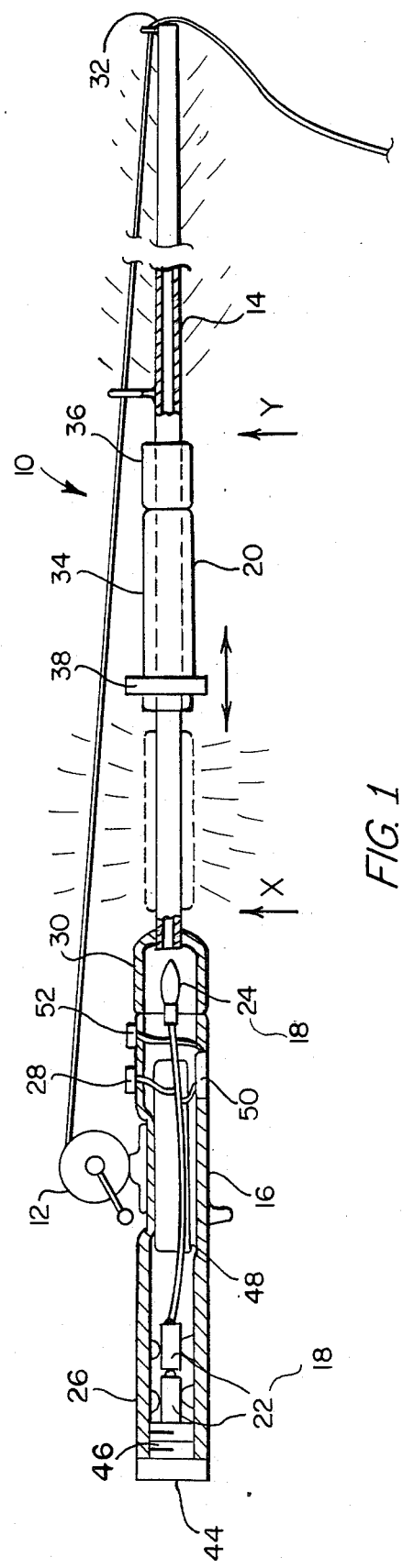
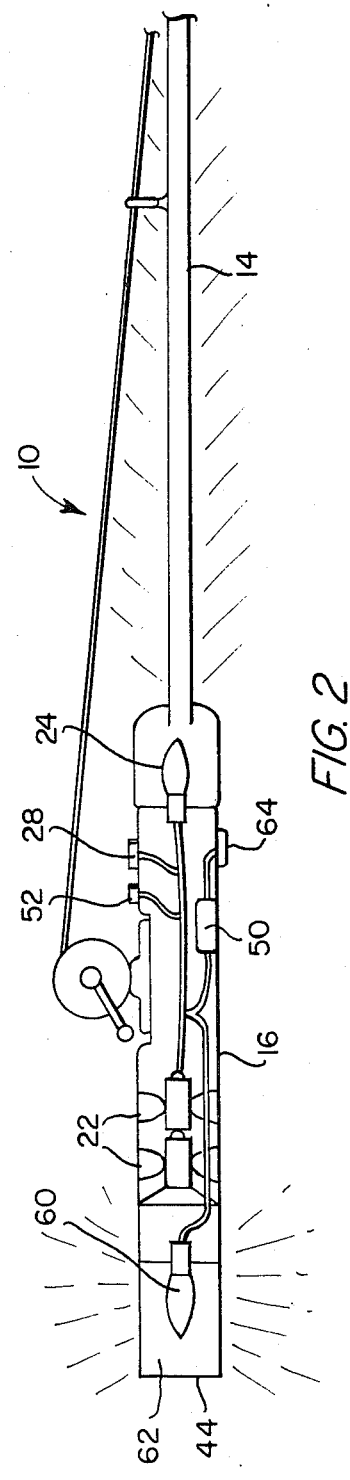
FIG. 1
FIG. 2

ILLUMINATED FISHING POLE

BACKGROUND OF THE INVENTION

The present invention relates to a lighted fishing pole and more particularly to a pole selectively lighted to illuminate the pole or an area near its base.

Fishing is often best at dawn and dusk. In addition, night fishing has become popular in many areas. The adequacy of visibility at such times has long been a problem. For example, baiting of hooks, changing of lures, the monitoring of rod movement (principally movement of the tip of the rod) for "nibbles" or "strikes", locating and opening food and drink on the pier or in the boat, and a myriad of other tasks are difficult in the absence of adequate visibility provided by a steady, even light source with properly adjusted intensity.

Further, an illuminated pole enhances the safety of the user and those in proximity therewith, as well as being an aid in retrieval should the rod become separated from its user in the darkness.

Lighted fishing poles are well known. Early poles included those such as those disclosed in the Shoemaker U.S. Pat. No. 2,012,894, dated Aug. 27, 1935, and the Frettem U.S. Pat. No. 2,283,430, dated May 19, 1942, which provide a light source exteriorly mounted on the rod but which pose an potential impediment to casting and efficient operation of the reel.

More recently lighted poles such as disclosed in the Scott U.S. Pat. No. 2,565,633, dated Aug. 28, 1951, the Organ U.S. Pat. No. 2,579,087 dated Dec. 18, 1951, the Cote U.S. Pat. No. 2,791,676, dated May 7, 1957, and the Hrdlicka, et al., U.S. Pat. No. 4,085,437, dated Apr. 18, 1978, incorporate a light source into the handle. While helpful in disclosing rod position, the light provided by these poles has little usefulness in baiting and other tasks.

Other lighted poles such as disclosed in the George U.S. Pat. No. 2,646,640, dated July 28, 1953 and the Oldfield U.S. Pat. No. 2,805,508, dated Sept. 10, 1957, also incorporate a glowing light source in the handle but have only limited usefulness in providing rod visibility for monitoring rod movement, and the intensity of the light source in such poles is generally not selectively variable.

Finally, lighted poles such as disclosed in the Fore U.S. Pat. No. 3,017,499, dated Jan. 16, 1962, the Petersen, Jr. U.S. Pat. No. 3,862,509, dated Jan. 28, 1975, the Ochs U.S. Pat. No. 4,026,059, dated May 31, 1977, and the Utsler U.S. Pat. No. 4,117,618, dated Oct. 3, 1978, provide a glowing rod and thus serve as a retrieval aid and safety alert. However, the rod glow emitted by such poles, because its intensity is not selectively controlled, has only limited usefulness in providing general illumination for baiting and other tasks. Additionally, such poles often have other complications, e.g., partial rather than complete illumination of the rod, a nonstandard rod/handle connection, and impediments internal to the rod which impede transmission of light from the light source throughout the rod.

Accordingly, it is an object of the present invention to obviate the disadvantages of generally known lighted fishing poles and to provide a novel fishing pole which selectively controls the intensity of area illumination for baiting and other tasks in addition to providing for the monitoring of rod movement, and which serves as an effective safety alert and retrieval aid, all without impairing other pole functions.

It is another object of the present invention to provide a night fishing pole with a glowing rod the intensity of which may be selectively varied between area illumination and rod illumination, all without impairing simultaneous operation of the rod and reel.

These and other objects and advantages will be readily apparent to one skilled in the art to which the invention pertains from a perusal of the claims and the following detailed description of preferred embodiments read in conjunction with the appended drawings.

THE DRAWINGS

FIG. 1 is a pictorial view of a preferred embodiment of the present invention in partial cross section illustrating movement of the rod's slidable glare controller.

FIG. 2 is a partial pictorial view of another embodiment in partial cross section illustrating both rod and handle illumination.

DETAILED DESCRIPTION OF PREFERRED EMBODIMENTS

With reference to the drawings and initially to the fishing pole assembly 10 of the preferred embodiment illustrated in FIG. 1, a fishing reel 12, a hollow rod 14, a handle 16, light source 18, and glow controller 20, are operatively connected in a manner explained more fully below.

The rod 14 and handle 16 are shown as separate components although they may alternatively be provided as a unitary construction if desired. The reel 12 is conventionally mounted on the handle 16 of the pole 10 to allow effective operation with one hand while gripping the handle 16 with the other hand. The light source 18 comprises any suitable battery or batteries 22 with connected bulb 24, and is disposed in an appropriate mounting inside the handle 16 which avoids any impediment to the grip 26.

An on/off switch 28 for the light source 18 is conveniently mounted on top of the handle 16 in front of the reel 12 in a position not to interfere with reel operation. The bulb 24 is operatively disposed adjacent the end of the rod 14 adjoining the handle 16 and is further disposed inside a light concentrating insert 30 which channels the light emitted from the bulb 24 longitudinally along the internal surfaces of the rod 14, and which preferably provides a mounting for bulb 24. For a pole 10 having a separate rod 14 and handle 16, the insert 30 also serves as an adapter to retain the rod 14 in operative connection with the handle 16. The end of the rod 14 which adjoins the handle 16 requires no special configuration.

The rod 14 is preferably tapered toward its tip 32 and free of internal obstructions which could impair transmission of light to the tip 32. Also, the rod 14 is preferably transparent or translucent to facilitate radiation of reflected light outward from its surfaces thus providing visible glow to assist in monitoring rod movement. The rod 14, as configured, provides rod glow which is brighter in portions of the rod 14 which are closer to the handle 16.

As further illustrated in FIG. 1, a glow controller 20 is shown at the end of the rod 14 adjacent the handle 16. The controller 20 comprises a slidable cover 34 frictionally overlying the rod 14 and being made preferably of foam rubber, although other materials may be used. The cover 34 is preferably removable by conventional means to allow maximum light glow from the rod 14 if desired. Also, the cover 34 preferably has an extendible portion 36 to further reduce rod glow if desired. Additionally, the cover 34 may be provided with any suitable conventional means such as a spring clip 38 for retaining the cover 34 in place when sliding is not desired.

The glow controller 20 operates to selectively vary the intensity of rod glow. As illustrated in FIG. 1, the controller 20, when in position X adjacent the handle 18, concentrates the illumination along the free end of the rod 14 and thus provides rod glow for monitoring rod movement. When the controller 20 is thereafter moved from position X toward position Y along the rod, the portion of the rod 14 immediately adjacent the handle becomes exposed. Because of the proximity of this unshielded section to the bulb, the light provided is adequate to illuminate surfaces and objects, such as the hook and bait, when positioned adjacent the handle. The intensity of light for various tasks may be selectively adjusted by the selected position of the cover 34 between positions X and Y along the rod, with maximum intensity of area illumination being provided at position Y.

Preferably, a screw cap 46 is incorporated into the butt 44 of the handle 16 to allow access to the light source 18, i.e., for removing it or for changing the batteries 22 or the bulb 24. Of course, if the light source 18 is configured as such, it may be used as a conventional flashlight after removal. Also, as illustrated in FIG. 1, a removable panel 48 may be provided in a longitudinal wall of the handle 16 to provide access to the light source 18. Alternatively, or in addition to the cover 34, a rheostat 50 may be provided to function as the controller 20.

As illustrated in FIG. 2, the pole assembly 10 of the present invention may alternatively have a second light source, in lieu of or in addition to a controller 20, for use in controlling the amount of light directed to surfaces adjacent the handle. The second light source preferably comprises a second light bulb 60 disposed to emit light from the butt 44 of handle 16 and may be powered by the batteries 22, or by a second power source (not shown in FIG. 2). Also, the butt 44 of handle 16 is preferably provided with a light diffusing lens 62 for directing light emitted from the second bulb 60 in a manner that provides glowing light in lieu of a concentrated beam of light. An on/off switch 64 may be positioned in a convenient location on the handle 16, preferably adjacent switch 28, for operating the second bulb 60 independently of bulb 24; or a convenient 3-position switch may be utilized.

For a particular task, the second light source may be activated, as illustrated in FIG. 2, to increase the area illumination. Illumination may be adjusted further as illustrated in FIG. 2 by the glare controller 20, which may be a rheostat 50 or slidable cover 34, or both.

In each of the embodiments illustrated, the pole assembly 10, when the rod 14 is glowing, also serves as an effective finding aid for the angler and as a safety alert to others, in addition to providing visibility for the purpose of monitoring pole movement.

Although the fishing pole assembly 10 of the present invention has been described principally in reference to night fishing, it should be evident that the invention may desirably find use in fishing also during twilight hours or on cloudy days. Further, it is to be understood that the invention may advantageously be used in both sport fishing as well as in commercial fishing enterprises which utilize rod and reel.

While the preferred embodiments of the present invention have been described, many variations and modifications will naturally occur to those skilled in the art from a perusal hereof. It is therefor to be understood that the embodiments described are illustrative only and that the scope of the invention is to be defined solely by the appended claims when accorded a full range of equivalents.

What is claimed is:

1. A fishing pole comprising:

a handle and a substantially transparent hollow rod with external eyes;

said handle having an internal compartment suitable for at least one battery and a light source;

an opague light concentrating insert secured to said handle and disposed about said light source for directing light from said light source internal to said rod, said rod tapering in diameter along the length thereof and being secured to said light concentrating insert forwardly thereof so that all of the light emitted by said source enters said rod to provide lateral illumination from said rod along the entire length thereof at an intensity which varies in a predetermined manner as a function of the distance from said source and the diameter of said rod, and said rod including an opague sleeve overlying said rod in frictional engagement therewith, having a length not less than about one-third of the length of said handle, having an extendible portion for increasing the length of said sleeve and being selectively positionable along said rod between a first and second position forward of said source, whereby the selective positioning of said sleeve unextended over a distance proximate to but spaced from said source does not vary the total axial distance along the length of said rod over which lateral illumination is provided, but does selectively vary the intensity of illumination of the rod.

2. The rod of claim 1 wherein said handle includes:

a substantially transparent portion;

a second light source within said handle to provide light to said portion; and means for selectively controlling the application of power to said two light sources.

* * * * *